(12) United States Patent
Ito et al.

(10) Patent No.: US 9,261,433 B2
(45) Date of Patent: Feb. 16, 2016

(54) MISFIRE DETECTION SYSTEM OF INTERNAL COMBUSTION ENGINE

(71) Applicants: Nippon Soken, Inc., Nishio-shi, Aichi-ken (JP); Toyota Jidosha Kabushiki Kaisha, Toyota-shi, Aichi-ken (JP)

(72) Inventors: Yuji Ito, Nishio (JP); Yoshiaki Atsumi, Susono (JP)

(73) Assignees: Nippon Soken, Inc., Nishio-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 71 days.

(21) Appl. No.: 14/288,924

(22) Filed: May 28, 2014

(65) Prior Publication Data

US 2014/0352414 A1 Dec. 4, 2014

(30) Foreign Application Priority Data

May 31, 2013 (JP) ................................. 2013-115471

(51) Int. Cl.
*G01M 15/11* (2006.01)

(52) U.S. Cl.
CPC ..................... *G01M 15/11* (2013.01)

(58) Field of Classification Search
CPC .............................. G01M 15/11; F02D 45/00
USPC ................ 73/114.02, 114.11, 114.13, 114.15
See application file for complete search history.

(56) References Cited

U.S. PATENT DOCUMENTS

| 5,606,119 A * | 2/1997 | Wallerand ............. G01M 15/11 73/114.11 |
| 6,185,928 B1 * | 2/2001 | Wallerand ............. G01M 15/11 123/406.24 |
| 7,099,769 B2 * | 8/2006 | Sato ....................... G01M 15/11 701/111 |
| 7,275,518 B1 * | 10/2007 | Gartner ............... F02D 41/0002 123/406.23 |
| 2004/0144165 A1 * | 7/2004 | Yamada ................. G01M 15/11 73/114.06 |
| 2005/0090968 A1 * | 4/2005 | Sato ....................... G01M 15/11 701/114 |
| 2007/0101806 A1 | 5/2007 | Yamaguchi |
| 2008/0148835 A1 | 6/2008 | Akimoto et al. |
| 2013/0255625 A1 * | 10/2013 | Kar ..................... F02D 41/1497 123/350 |
| 2013/0312504 A1 * | 11/2013 | Bowman ............. F02D 41/0097 73/114.05 |

FOREIGN PATENT DOCUMENTS

| JP | 2006-266253 A | 10/2006 |
| JP | 2007-030710 A | 2/2007 |
| JP | 2009-174397 A | 8/2009 |
| WO | 2009093296 A1 | 7/2009 |

* cited by examiner

*Primary Examiner* — Eric S McCall
(74) *Attorney, Agent, or Firm* — Dinsmore & Shohl LLP

(57) ABSTRACT

When ignition is retarded in an internal combustion engine, an engine misfire detection system calculates a difference between combustion-time engine torque produced when combustion takes place in the engine, and expansion torque corresponding to non-combustion-time engine torque produced when the engine rotates without causing combustion, at intervals of a predetermined crank angle, calculates a shift amount with which a total value of the differences within a misfire determination period is maximized, and shifts the misfire determination period by the shift amount.

3 Claims, 7 Drawing Sheets

MISFIRE DETECTION SYSTEM OF INTERNAL COMBUSTION ENGINE

INCORPORATION BY REFERENCE

The disclosure of Japanese Patent Application No. 2013-115471 filed on May 31, 2013 including the specification, drawings and abstract is incorporated herein by reference in its entirety.

BACKGROUND OF THE INVENTION

1. Field of the Invention

The invention relates to an engine misfire detection system for use in a hybrid vehicle including a spark ignition type internal combustion engine having a plurality of cylinders, and a motor-generator.

2. Description of Related Art

As a misfire detection system of an internal combustion engine installed on a hybrid vehicle, a system as described in Japanese Patent Application Publication No. 2006-266253 (JP 2006-266253 A) is known. In order to accurately determine the presence or absence of misfire even in the case where the ignition timing of the engine is retarded, the system of JP 2006-266253 A sequentially computes fluctuations in the engine speed at the time of ignition in each cylinder, and determines misfire by comparing the engine speed between the first rotation and the second rotation. Other related-art documents related to this invention include Japanese Patent Application Publication No. 2007-30710 (JP 2007-30710 A) and Japanese Patent Application Publication No. 2009-174397 (JP 2009-174397 A).

Generally, as the number of cylinders of the internal combustion engine is larger, the interval of combustion between the cylinders becomes shorter. Therefore, as the number of cylinders increases, combustion overlapping is more likely to occur, namely, torque produced by combustion in a certain cylinder is more likely to overlap torque produced by combustion in a cylinder that reaches the ignition timing next. Further, if the ignition timing is retarded, the combustion timing is delayed, and therefore, the influence of the combustion overlapping expands. Due to the influence of the combustion overlapping, it becomes difficult to determine which one of the cylinders undergoes fluctuations in the engine speed when misfire is determined, as in the system of JP 2006-266253; therefore, the determination accuracy may deteriorate.

SUMMARY OF THE INVENTION

The invention provides a misfire detection system of an internal combustion engine installed on a hybrid vehicle, which system curbs deterioration of the accuracy in determination of misfire when ignition is retarded in the engine.

An engine misfire detection system according to one aspect of the invention is used in a hybrid vehicle including a spark ignition type internal combustion engine having a plurality of cylinders, and a motor-generator. The engine misfire detection system includes a misfire determining portion that determines misfire of the internal combustion engine for each of the cylinders, by evaluating combustion-time engine torque produced when combustion takes place in the internal combustion engine, within a misfire determination period that is set to a predetermined range of crank angle, a torque difference calculating portion that calculates a difference between the combustion-time engine torque, and a non-combustion-time engine torque produced when the internal combustion engine rotates without causing combustion, at intervals of a predetermined crank angle, and a shifting portion that shifts the misfire determination period in a direction to increase a total value of the differences calculated by the torque difference calculating portion within the misfire determination period, when ignition is retarded in the internal combustion engine.

The combustion-time engine torque produced when combustion takes place in the internal combustion engine is a combination of expansion torque produced when air compressed in the cylinder elastically expands, and combustion torque produced from combustion energy. Since the combustion torque is not produced when the engine rotates without causing combustion, e.g., during motoring, the non-combustion-time torque corresponds to the expansion torque. Accordingly, the combustion torque is obtained by calculating a difference between the combustion-time engine torque and the non-combustion-time engine torque. If the ignition timing is retarded in the engine, a point in time at which the combustion torque reaches its peak is delayed relative to a point in time at which the non-combustion-time engine torque reaches its peak. Further, the combustion-time engine torque is reduced due to retardation of the ignition timing. Therefore, if the starting point of the misfire determination period is fixed for each cylinder, combustion overlapping occurs, namely, combustion torque of a certain cylinder is partially included in the misfire determination period of a cylinder of which the ignition timing comes next, and the influence of the combustion overlapping becomes larger than that in the case where the ignition timing is not retarded. Accordingly, when the ignition timing is retarded, the combustion-time engine torque in the misfire determination period may be inaccurately evaluated, and the accuracy in determination of misfire may deteriorate.

The misfire detection system according to the above aspect of the invention shifts the misfire determination period in the direction to increase the total value of the differences between the combustion-time engine torque and the non-combustion-time engine torque calculated at intervals of the predetermined crank angle, within the misfire determination period. Namely, the starting point of the misfire determination period is moved while the same length of the misfire determination period is maintained. Since the difference between the combustion-time engine torque and the non-combustion-time engine torque corresponds to the combustion torque, a greater portion of the combustion torque is included in the misfire determination period and the influence of the combustion overlapping is reduced as the total value of the differences in the misfire determination period is larger. With the misfire determination period thus shifted in the direction to increase the total value, the combustion torque produced in each cylinder can fall within the misfire determination period as much as possible, and the influence on the next misfire determination period can be reduced. Thus, the combustion-time engine torque in the misfire determination period is evaluated with improved accuracy, and the accuracy in determination of misfire is less likely or unlikely to deteriorate. In this connection, increasing the total value means increasing the total value from the total value of the differences in the misfire determination period having the starting point before shifting.

The engine misfire detection system according to the above aspect of the invention may further include a non-combustion-time engine torque obtaining portion that obtains and stores the non-combustion-time engine torque at intervals of the predetermined crank angle, during a period in which fuel cut is performed in the internal combustion engine, and the torque difference calculating portion may calculate a difference between the combustion-time engine torque and the non-combustion-time engine torque stored in the non-combustion-time engine torque obtaining portion, at intervals of the predetermined crank angle. With this arrangement, it is possible to obtain the non-combustion-time engine torque in view of individual differences and chronological changes of the internal combustion engine, as compared with the case where the difference is calculated using non-combustion-time engine torque obtained from a map that is created in advance by simulation or experiment using an actual machine, for example. Thus, the difference is calculated in accordance with the actual conditions, resulting in improvement in the accuracy in determination of misfire.

In the engine misfire detection system as described above, the non-combustion-time engine torque obtaining portion may obtain the non-combustion-time engine torque by calculation based on an angular acceleration and a moment of inertia of the internal combustion engine, and an angular acceleration and a moment of inertia of the motor-generator. Since the moments of inertia of the internal combustion engine and the motor-generator are known physical quantities, the non-combustion-time engine torque can be obtained at intervals of the predetermined crank angle by obtaining the angular accelerations of the engine and the motor-generator, which vary according to the crank angle.

With the misfire detection system configured according to the above aspect of the invention, the misfire determination period is shifted in the direction to increase the total value of the differences between the combustion-time engine torque and the non-combustion-time engine torque calculated at intervals of the predetermined crank angles, within the misfire determination period. Therefore, the combustion torque produced in each cylinder falls within the misfire determination period as much as possible, and the influence of the combustion torque on the next misfire determination period can be reduced. Accordingly, the combustion-time engine torque in the misfire determination period is evaluated with improved accuracy, and the accuracy in determining the presence or absence of misfire is less likely or unlikely to deteriorate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

Figure 1:
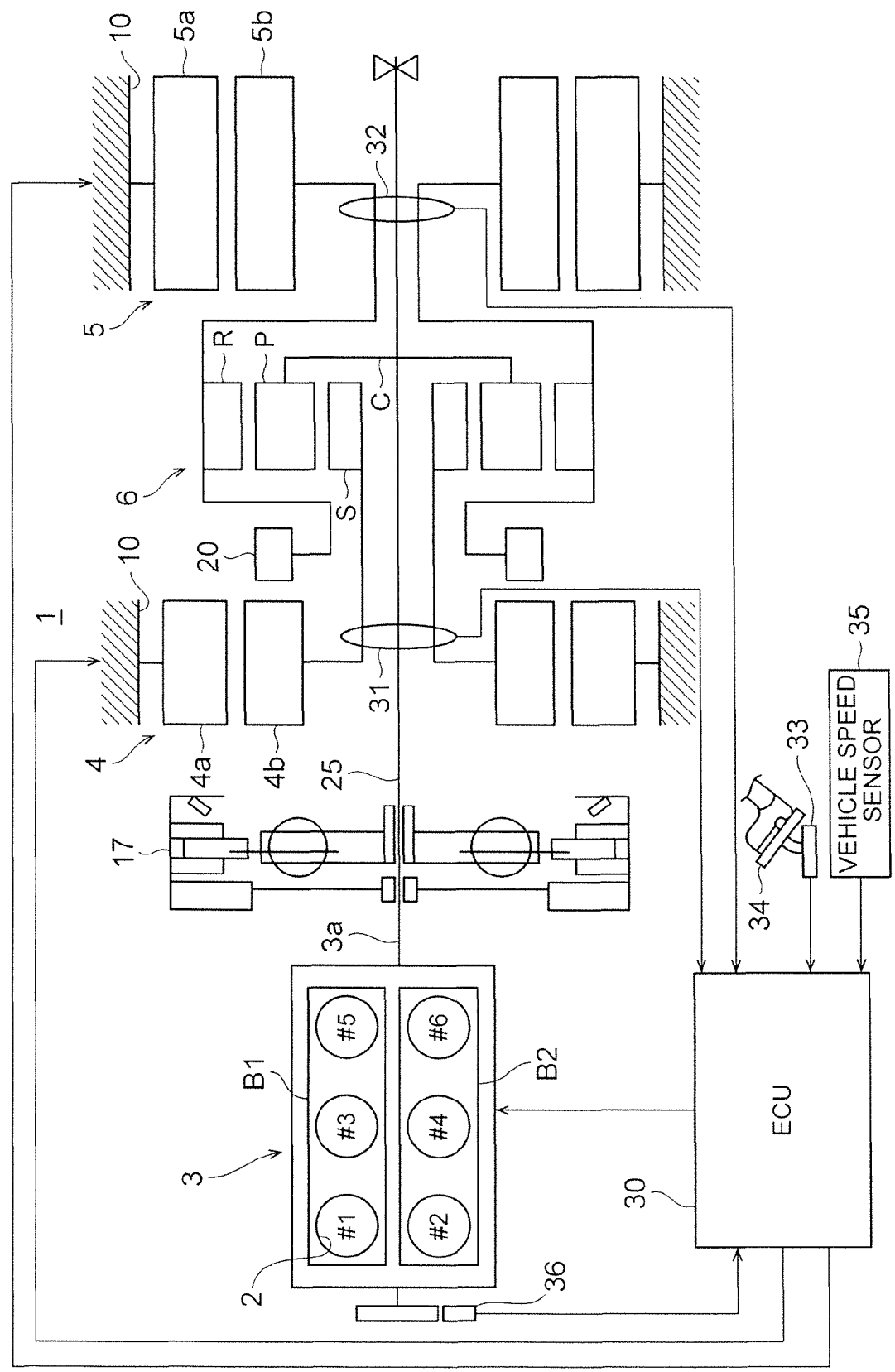
FIG. 1 is a view showing the overall configuration of a hybrid vehicle in which a misfire detection system according to one embodiment of the invention is used.

DETAILED DESCRIPTION OF EMBODIMENTS (First Embodiment) As shown in FIG. 1, a vehicle 1 is configured as a hybrid vehicle having a combination of two or more power sources. The vehicle 1 includes an internal combustion engine 3 and two motor-generators 4, 5 as power sources for running the vehicle. The internal combustion engine 3 is configured as a V-type, six-cylinder, spark ignition engine having six cylinders 2. Cylinder numbers #1-#6 are assigned to the respective cylinders 2, such that odd-number cylinder numbers #1, #3, #5 are assigned to the cylinders 2 mounted in one bank B1, and even-number cylinder numbers #2, #4, #6 are assigned to the cylinders 2 mounted in the other bank B2. In this case, the order of ignition in the engine 3 is set to #1, #2, #3, #4, #5, #6. Since the engine 3 has six cylinders, the ignition interval of the cylinders 2 is 120° by crank angle. In the following, when the crank angle or its magnitude is indicated by a numeral value, the numeral value is followed by "° CA" that means crank angle.

The internal combustion engine 3 and the first motor-generator 4 are coupled to a power split device 6. The first motor-generator 4 has a stator 4a and a rotor 4b. The stator 4a is fixed to a case 10. The first motor-generator 4 functions as a generator that generates electric power when receiving power of the engine 3 which is distributed by the power split device 6, and also functions as an electric motor that is driven with AC power. Similarly, a second motor-generator 5 has a stator 5a fixed to the case 10, and a rotor 5b, and functions as an electric motor and a generator. The first motor-generator 4 corresponds to the motor-generator according to the invention.

The power split device 6 is configured as a single-pinion-type planetary gear mechanism. The power split device 6 has a sun gear S in the form of an external gear, a ring gear R in the form of an internal gear disposed coaxially with the sun gear S, and a planetary carrier C that holds a pinion P that meshes with these gears S, R such that the pinion P can rotate about itself and about the axis of the device 6. Engine torque generated by the engine 3 is transmitted to the planetary carrier C of the power split device 6, via a torsional damper 17.

The rotor 4b of the first motor-generator 4 is coupled to the sun gear S of the power split device 6. Torque generated from the power split device 6 via the ring gear R is transmitted to an output gear 20. The torque generated from the output gear 20 is transmitted to driving wheels (not shown) via various transmission mechanisms.

Each part of the vehicle 1 is controlled by an electronic control unit (ECU) 30 configured as a computer. The ECU 30 performs various controls on the engine 3, motor-generator 4, 5, and so forth. The ECU 30 receives various types of information concerning the vehicle 1. For example, the ECU 30 receives an output signal of a first resolver 31 that outputs a signal corresponding to the rotational angle of the first motor-generator 4, an output signal of a second resolver 32 that outputs a signal corresponding to the rotational angle of the second motor-generator 5, an output signal of an accelerator pedal position sensor 33 that outputs a signal corresponding to the amount of depression of an accelerator pedal 34, an output signal of a vehicle speed sensor 35 that outputs a signal corresponding to the vehicle speed of the vehicle 1, and an output signal of a crank angle sensor 36 that outputs a signal corresponding to the crank angle of the engine 3.

The ECU 30 calculates required driving force requested by the driver, referring to the output signal of the accelerator pedal position sensor 33 and the output signal of the vehicle speed sensor 35, and controls the vehicle 1 while selecting one of various operating modes so as to provide the optimum system efficiency for the required driving force. For example, in a low-load region in which the thermal efficiency of the engine 3 is reduced, combustion is stopped in the engine 3, and the vehicle 1 is operated in an EV mode in which the second motor-generator 5 is driven. When torque generated solely by the engine 3 is insufficient, the vehicle 1 is operated in a hybrid mode in which the second motor-generator 5 as well as the engine 3 is used as a driving source for running the vehicle 1.

Figure 2:
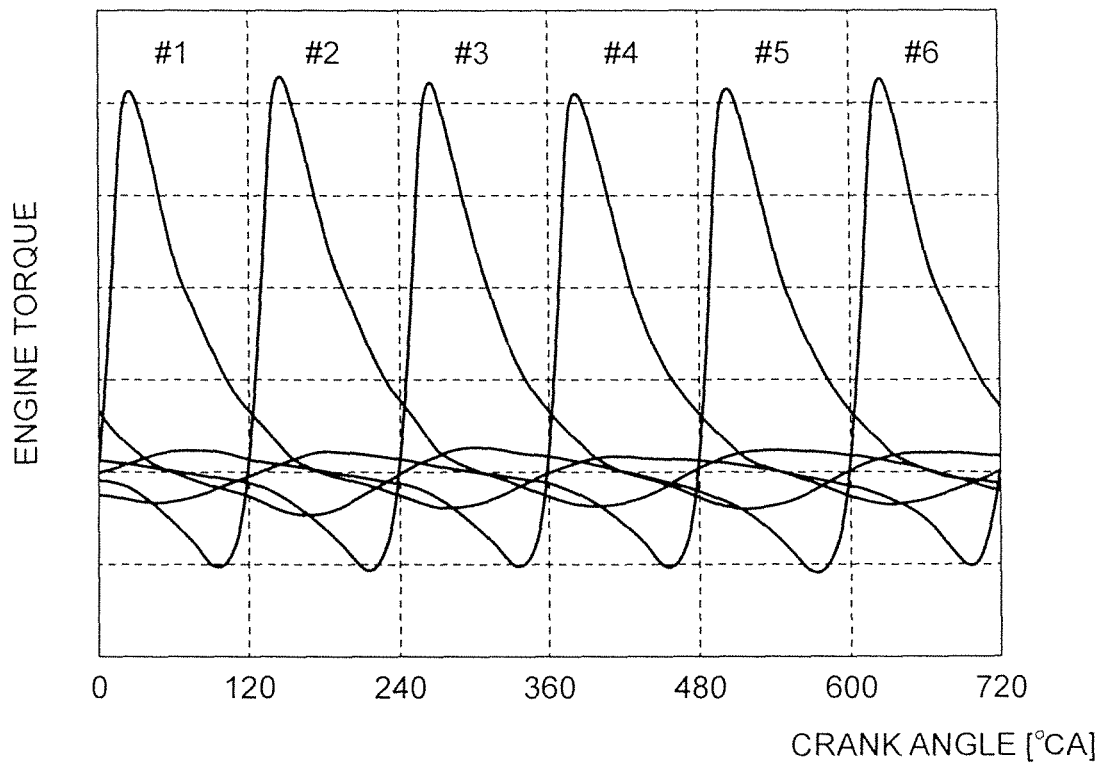
FIG. 2 is a view showing engine torques of respective cylinders, which are superimposed on one another, when the ignition timing is advanced.
Figure 3:
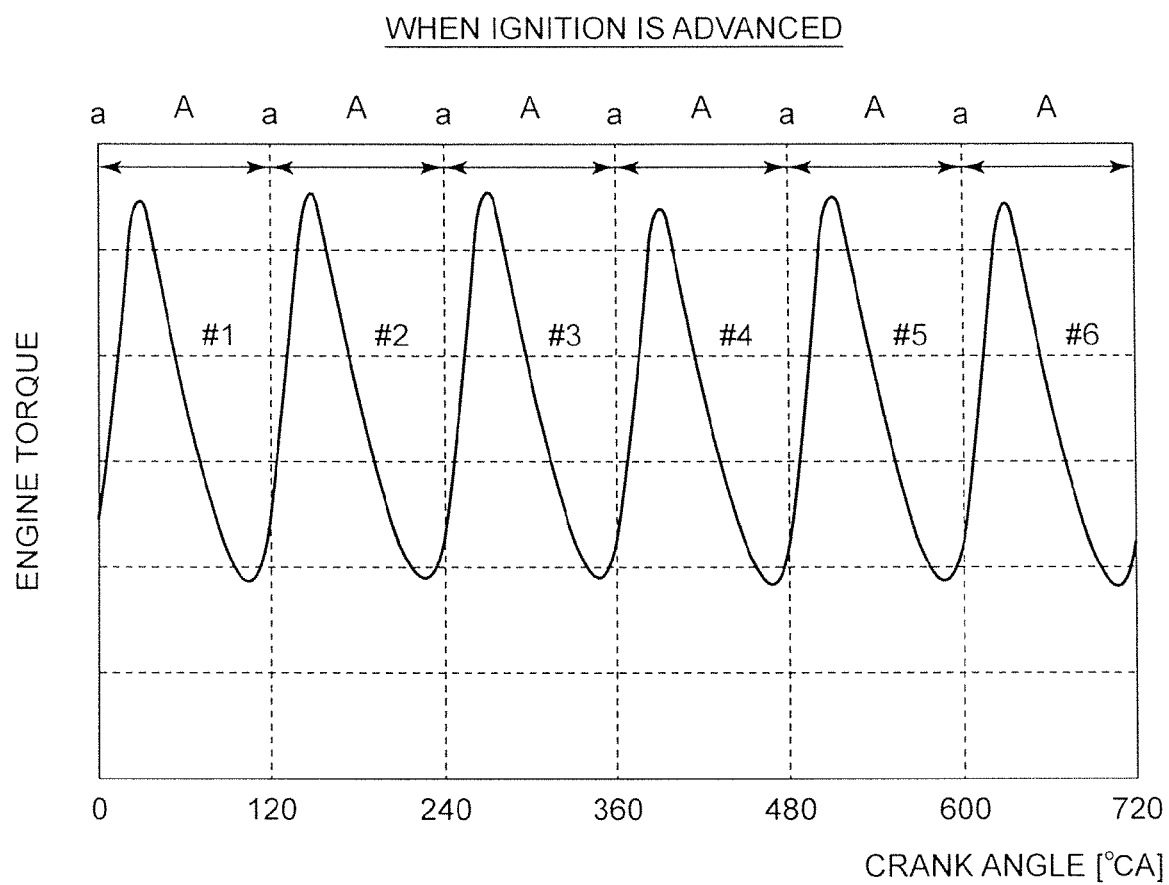
FIG. 3 is a view showing the sum of engine torques of respective cylinders of FIG. 2.

The ECU 30 also functions as a misfire detection system that determines the presence or absence of misfire for each cylinder 2 in the engine 3. This embodiment is characterized by a misfire determining process performed when ignition is retarded in the engine 3. Before explaining the characteristics of this embodiment, various basic matters regarding the misfire determining process will be explained referring to FIG. 2 through FIG. 4. FIG. 2 shows engine torque produced when ignition is advanced in the engine 3. In FIG. 2, engine torques generated from the respective cylinders 2 are illustrated such that they are superimposed on one another. FIG. 3 shows a waveform produced when the engine torques of the respective cylinders 2 as shown in FIG. 2 are combined together. As described above, the ignition interval between the cylinders 2 of the engine 3 is set to 120° CA. As shown in FIGS. 2 and 3, where the length of a misfire determination period A in which misfire is determined is 120° CA, and the starting points a of the misfire determination periods A provided for the respective cylinders 2 are set to 0° CA, 120° CA, 240° CA, 360° CA, 480° CA, and 600° CA, most of the engine torque of each cylinder 2 is covered by the corresponding misfire determination period A even if combustion in one cylinder overlaps combustion in another cylinder, when ignition is advanced in the engine 3. Furthermore, a difference between engine torque at normal times and engine torque at the time of misfire is larger when ignition is advanced, as compared with the time when ignition is retarded. Therefore, when ignition is advanced as shown in FIG. 2 and FIG. 3, it is possible to determine misfire with sufficiently high accuracy, by evaluating engine torque in the misfire determination period A, even if some combustion overlapping takes place.

Figure 4:
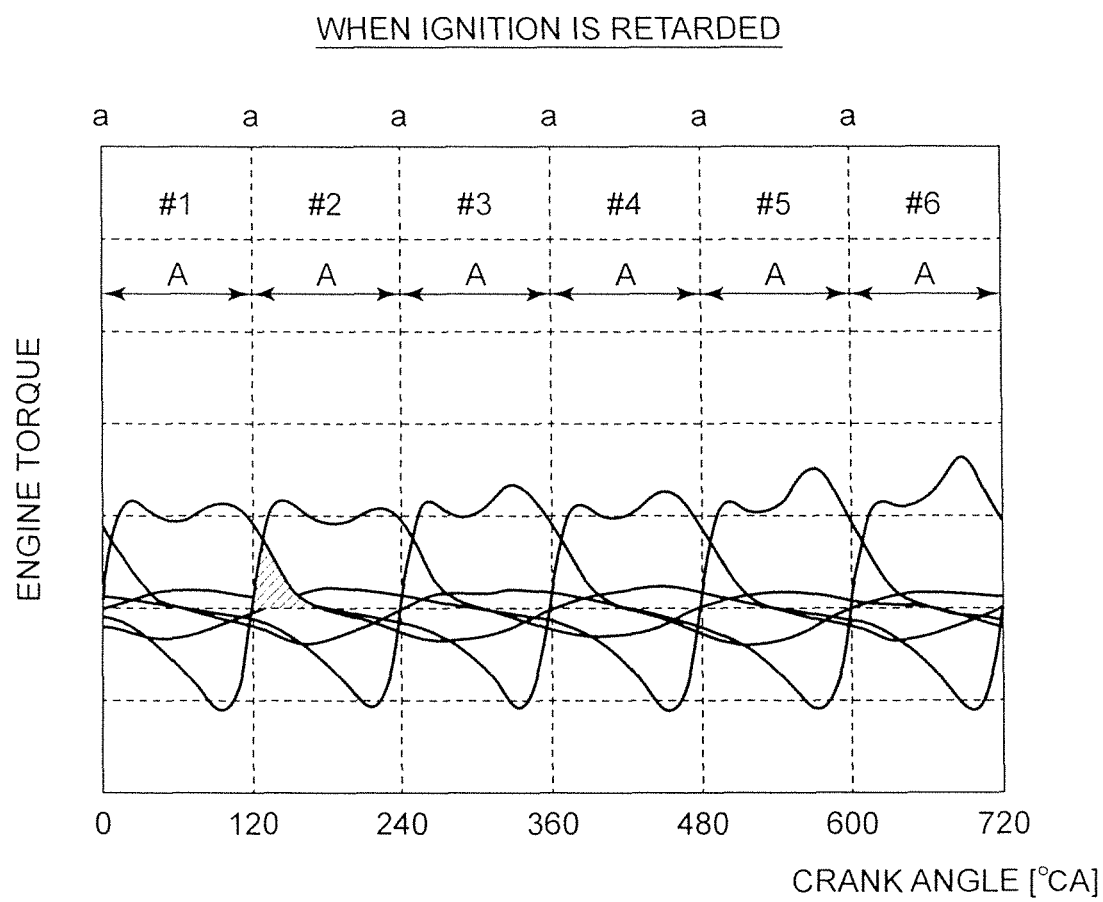
FIG. 4 is a view showing engine torques of respective cylinders, which are superimposed on one another, when the ignition timing is retarded.

On the other hand, when ignition is retarded in the engine 3, as shown in FIG. 4, occurrence of combustion torque is delayed due to retardation of ignition, and engine torque itself is reduced; therefore, an influence of combustion overlapping indicated by a hatched area in FIG. 4 is increased. Therefore, if the misfire determination period A and the starting point a for each cylinder are set as shown in FIG. 4, in the same manner as that in the case where ignition is advanced as shown in FIG. 2 and FIG. 3, the engine torque in the misfire determination period A is not accurately evaluated, and misfire is determined with reduced accuracy.

Figure 5:
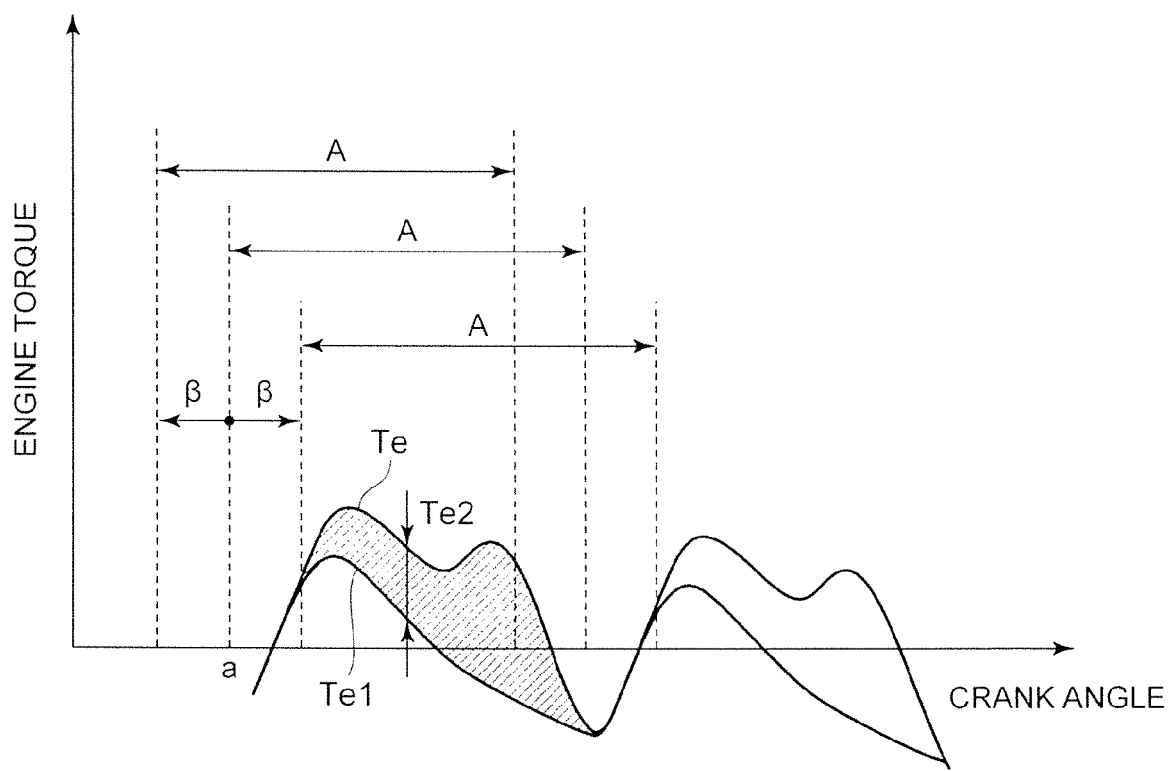
FIG. 5 is a view useful for explaining a method of shifting a misfire determination period.

As shown in FIG. 5, combustion-time engine torque Te produced when combustion occurs in the engine 3 consists of expansion torque Te1 produced when air compressed in the cylinder 2 elastically expands, and combustion torque Te2 produced from combustion energy. When misfire occurs, the combustion torque Te2 is not produced, and only the expansion torque Te1 is generated as the combustion-time engine torque Te. Therefore, if the presence or absence of the combustion torque Te2 can be accurately evaluated, the accuracy in determination of misfire is enhanced. Accordingly, it is possible to evaluate engine torque with a reduced influence of combustion overlapping, by setting the misfire determination period A so that the combustion torque Te2 falls within the period A as much as possible. Since the combustion torque Te2 corresponds to a difference between the combustion-time engine torque Te and the expansion torque Te1, it is possible to accurately determine the presence or absence of the combustion torque Te2, or the presence or absence of misfire, by setting a period that covers a hatched region in FIG. 5 to the largest extent as the misfire determination period A. Thus, in the misfire determination process of this embodiment, a difference between the combustion-time engine torque Te and the expansion torque Te1 is calculated for each given crank angle, and a shift amount β by which the misfire determination period A is shifted is calculated so that the total value of the differences for the respective crank angles in the misfire determination period A is maximized. Then, the misfire determination period A is shifted by the shift amount β. In this manner, the combustion torque Te2 produced in each cylinder 2 falls within the misfire determination period A as much as possible, and the influence of the combustion torque Te2 on the next misfire determination period A is reduced; therefore, the accuracy in determination of misfire is less likely or unlikely to deteriorate.

Figure 6:
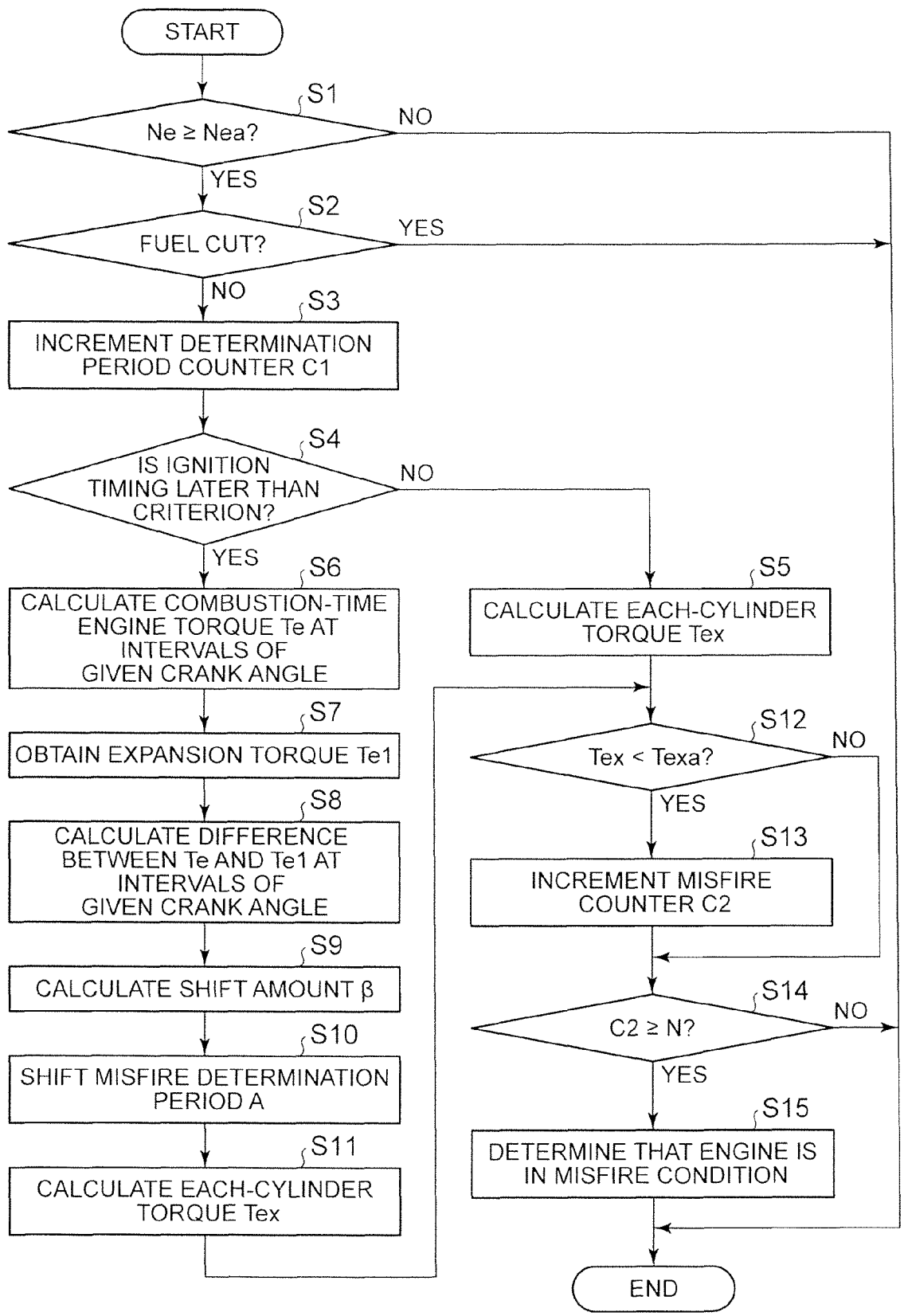
FIG. 6 is a flowchart illustrating one example of control routine according to a first embodiment of the invention.

To implement the above-described control, the ECU 30 executes a control routine of FIG. 6. A program of the control routine of FIG. 6, which is stored in the ECU 30, is read at appropriate times and repeatedly executed at given intervals. In step S1, the ECU 30 determines whether the engine speed Ne of the engine 3 is equal to or higher than a reference value Nea based on which it is determined whether combustion takes place in the engine 3. For example, the reference value Nea is set to 400 rpm. The engine speed Ne is calculated based on the output signal of the crank angle sensor 36. If the engine speed Ne is equal to or higher than the reference value Nea, the ECU 30 proceeds to step S2. If the engine speed Ne is lower than the reference value Nea, the ECU 30 skips the following steps, and finishes this cycle of the routine. In step S2, the ECU 30 determines whether the engine 3 is under fuel cut control in which no combustion takes place in the engine 3. If the fuel cut is not performed, and combustion takes place in the engine 3, the ECU 30 proceeds to step S3. If the fuel cut is performed, the ECU 30 skips the following steps, and finishes this cycle of the routine.

In step S3, the ECU 30 increments a determination period counter C1. The determination period counter C1 is a parameter that specifies the cylinder 2 on which a misfire determination is to be made. By referring to the value of this counter C1, it is possible to specify which one of the six cylinders 2 is an object of misfire determination. This makes it possible to determine misfire for each cylinder 2. In step S4, the ECU 30 determines whether the ignition timing of the engine 3 is later than a predetermined criterion, namely, whether the ignition timing is retarded relative to the criterion. The criterion is set to, for example, 5° CA before the top dead center, or BTDC 5° CA. When the ignition timing is not retarded from the criterion, the ECU 30 proceeds to step S5. When the ignition timing is retarded from the criterion, the ECU 30 proceeds to step S6.

In step S5, the ECU 30 calculates each-cylinder torque Tex. The each-cylinder torque Tex is the average value of combustion-time engine torque Te in the misfire determination period A (see FIG. 2 and FIG. 3). While the method of calculating the average value is not limited to any particular method, the ECU 30 specifies the misfire determination period A corresponding to the cylinder 2 as an object of misfire determination, by referring to the determination period counter C1. Then, the ECU 30 obtains a plurality of calculation values (samples) of the combustion-time engine torque Te in the specified misfire determination period A, and obtains the arithmetic average of the samples. The number and interval of the calculation values of the combustion-time engine torque Te are set to appropriate values. In this embodiment, a total of 120 samples of combustion-time engine torque Te are obtained at intervals of 1° CA within the range of 120° CA as measured from the top dead center of the cylinder 2 as an object of misfire determination. The combustion-time engine torque Te in the misfire determination period A is calculated according to the following equation (1).

$$Te = Ie * d\omega e + (1 + \rho)/\rho * (Ig * d\omega g - Tg) \quad (1)$$

In the above equation, Ie is the moment of inertia of the engine 3, dωe is the angular acceleration of the engine 3, Ig is the moment of inertia of the first motor-generator 4, dωg is the angular acceleration of the first motor-generator 4, Tg is torque reaction force of the first motor-generator 4, and ρ is the planetary gear ratio of the power split device 6.

In the above equation (1), the moments of inertia Ie, Ig, and the planetary gear ratio ρ are known constants of physical quantities, respectively. The remaining parameters are calculated by the ECU 30. The ECU 30 calculates the angular acceleration dωe of the engine 3, based on the output signal of the crank angle sensor 36, and calculates the angular acceleration dωg of the first motor-generator 4, based on the output signal of the first resolver 31. The torque reaction force Tg is always grasped by the ECU 30 as a control parameter of the first motor-generator 4; therefore, the torque reaction force Tg grasped by the ECU 30 is used. The ECU 30 calculates the each-cylinder torque Tex in the misfire determination period A by obtaining the average value of the plurality of samples of the combustion-time engine torque Te calculated according to the above equation (1).

On the other hand, when the ignition timing is retarded, the ECU 30 calculates the combustion-time engine torque Te at intervals of a given crank angle, e.g., 30° CA, in step S6. This calculation is conducted according to the above method using the above equation (1). The range of calculation of the combustion-time engine torque Te, which is specified by crank angle, may be set as appropriate. In this embodiment, the combustion-time engine torque Te is calculated within the calculation range from 120° CA before the top dead center of the cylinder 2 as an object of misfire determination, to 120° CA after the top dead center.

In step S7, the ECU 30 obtains expansion torque Te1 as non-combustion-time torque. The ECU 30 obtains the expansion torque Te1 by reading the expansion torque Te1 corresponding to the same crank angle as that of the combustion-time engine torque Te calculated in step S6, referring to a map (not shown) that defines correspondence between the expansion torque Te1 and the crank angle, which map is stored in advance in the ECU 30. The correspondence between the expansion torque Te1 and the crank angle is investigated in advance by an investigation method, e.g., by experiment or simulation, and this map is created based on the result of investigation. In step S8, the ECU 30 calculates a difference between the combustion-time engine torque Te and the expansion torque Te1 at intervals of the same crank angle as that used in step S6.

In step S9, the ECU 30 calculates the shift amount β of the misfire determination period A. The shift amount β is calculated by the method as described above referring to FIG. 5. Namely, the ECU 30 shifts the misfire determination period A from the starting point a (see FIG. 4) before shifting, while keeping the length of the misfire determination period A constant, and obtains a total value of the above-described respective differences included in the misfire determination period A thus shifted. Then, the ECU 30 calculates the shift amount β, by searching for the shift amount β with which the total value is maximized.

In step S10, the ECU 30 shifts the misfire determination period A by the shift amount β calculated in step S9. In step S11, the ECU 30 calculates the each-cylinder torque Tex in the misfire determination period A thus shifted in step S10. The method of calculating the each-cylinder torque Tex is the same as the calculation method of step S5.

In step S12, the ECU 30 determines whether the each-cylinder torque Tex, which is calculated in step S5 or step S11, is smaller than misfire determination torque Texa. The misfire determination torque Texa is set to the upper limit of a torque range in which it can be assumed that misfire has occurred. Accordingly, when the each-cylinder torque Tex is smaller than the misfire determination torque Texa, it can be assumed that misfire has occurred. When the each-cylinder torque Tex is smaller than the misfire determination torque Texa, the ECU 30 proceeds to step S13. When the each-cylinder torque Tex is equal to or larger than the misfire determination torque Texa, the ECU 30 skips step S13, and proceeds to step S14.

In step S13, the ECU 30 increments a misfire counter C2 for counting the number of times or frequency of occurrence of misfire. In step S14, the ECU 30 determines whether the value of the misfire counter C2 is equal to or larger than a predetermined threshold value. Misfire may incidentally occur for some reason. Therefore, the threshold value N is set so as to distinguish misfire that occurs incidentally, from misfire caused by engine malfunction. If the value of the misfire counter C2 is equal to or larger than the threshold value N, the control proceeds to step S15. If the value of the misfire counter C2 is smaller than the threshold value N, the ECU 30 finishes this cycle of the routine. In step S15, the ECU 30 determines that the engine is in a misfire condition in which misfire has occurred due to engine malfunction. When the ECU 30 determines that the engine is in the misfire condition, it turns on an alarm lamp (not shown).

According to the control routine of FIG. 6, the misfire determination period A is shifted by the shift amount β, so that the combustion torque Te2 produced in each cylinder 2 falls within the misfire determination period A as much as possible, as described above. As a result, the influence of the combustion torque Te2 on the next misfire determination period A is reduced, and the misfire determination accuracy is less likely or unlikely to deteriorate. The ECU 30 may functions as a misfire determining portion according to the first embodiment of the invention when executing step S5 or step S11 and step S12 of FIG. 6, and may function as a torque difference calculating portion according to the first embodiment of the invention when executing step S8 of FIG. 6. Also, the ECU 30 may function as a shifting portion according to the first embodiment of the invention when executing step S9 and step S10 of FIG. 6.

(Second Embodiment) Next, a second embodiment of the invention will be described with reference to FIG. 7. Since the second embodiment is similar to the first embodiment except for the control content, FIG. 1 is to be referred to for the physical arrangement of the second embodiment. The control of the second embodiment is carried out in combination with the control routine of FIG. 6. In the first embodiment, the expansion torque Te1 as non-combustion-time engine torque is calculated based on the map created in advance by experiment, or the like, and stored in the ECU 30, in step S7 of FIG. 6. In the second embodiment, the expansion torque Te1 is calculated during running of the vehicle 1, instead of using the map, and the misfire determination process is performed using database in which the expansion torque Te1 is organized by each crank angle. Namely, the ECU 30 calculates the expansion torque Te1 based on the database, when executing step S7 of FIG. 6.

Figure 7:
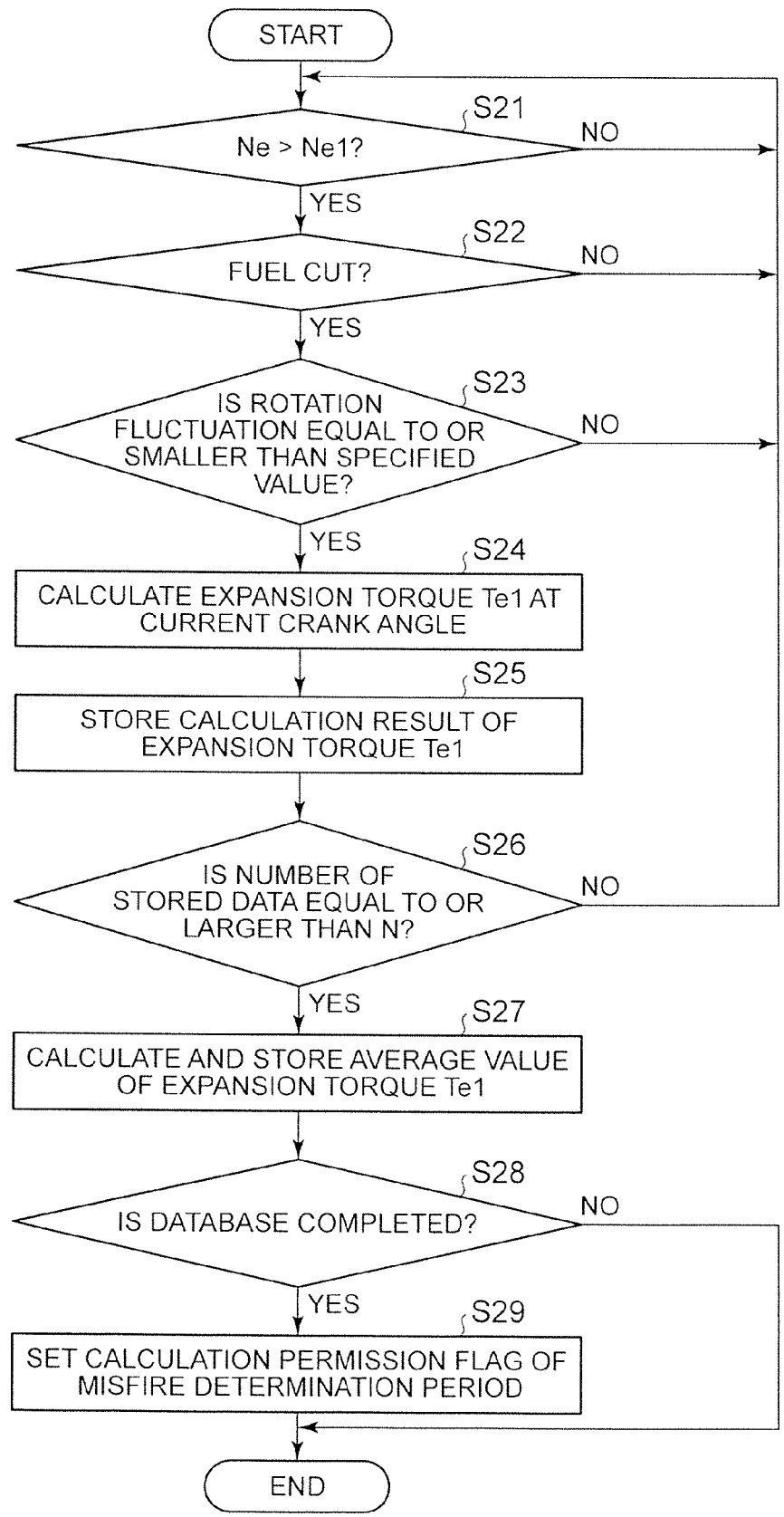
FIG. 7 is a flowchart illustrating one example of control routine according to a second embodiment of the invention.

A program of a control routine of FIG. 7 is stored in the ECU 30, and repeatedly executed at given intervals. In step S21, the ECU 30 determines whether the engine speed Ne is larger than a reference value Ne1. The reference value Ne1 is set to a value, e.g., 600 rpm, based on which it is determined whether the engine speed Ne is sufficiently high. If the engine speed Ne is higher than the reference value Ne1, the control proceeds to step S22. If the engine speed Ne is equal to or lower than the reference value Ne1, the ECU 30 returns to step S21. In step S22, the ECU 30 determines whether the engine 3 is under fuel cut control, and proceeds to step S23 when the engine 3 is under fuel cut control. If not, the ECU 30 returns to step S21. In step S23, the ECU 30 determines whether rotation fluctuation of the engine 3 is equal to or smaller than a specified value, so as to assure sufficient accuracy of calculation results. The rotation fluctuation is calculated based on the output signal of the crank angle sensor 36, and corresponds to a change in the engine speed Ne per given time. If the rotation fluctuation of the engine 3 is equal to or smaller than the specified value, the ECU 30 proceeds to step S24. If the rotation fluctuation of the engine 3 exceeds the specified value, the ECU 30 returns to step S21.

If affirmative decisions are made in all of step S21 to step S23, the ECU 30 calculates the expansion torque Te1 at the current crank angle in step S24. The calculation of the expansion torque Te1 is performed using the above-indicated equation (1) in a manner similar to the manner of calculation of the combustion-time engine torque Te as described above. Since the moments of inertia of the engine 3 and the first motor-generator 4 are known constants of physical quantities, as described above, the ECU 30 can obtain the expansion torque Te1 for each given crank angle, by obtaining the angular accelerations of the engine 3 and the first motor-generator 4 by calculation. In step S25, the ECU 30 stores the calculation result of step S24 in association with the crank angle.

In step S26, the ECU 30 determines whether the number of calculation results (the number of pieces of stored data) of the expansion torque Te1 corresponding to the crank angle at the time of calculation of step S24 is equal to or larger than N. N is the number of samples used for calculating the average value of the expansion torques Te1 for each of predetermined crank angles, and is set to an appropriate value. If the number of pieces of stored data is equal to or larger than N, the ECU 30 proceeds to step S27. If the number of pieces of stored data is smaller than N, the ECU 30 returns to step S21.

In step S27, the ECU 30 calculates the average value of the expansion torques Te1 corresponding to the crank angle for which the number of pieces of stored data reaches N, and stores the average value as the expansion torque Te1 for the crank angle, so as to create database. In step S28, the ECU 30 determines whether the average values of the expansion torques Te1 for all of the predetermined crank angles are stored, namely, whether the database is completed. If the database is completed, the ECU 30 proceeds to step S29. If not, the ECU 30 skips step S29, and finishes this cycle of the routine. In step S29, the ECU 30 sets a calculation permission flag for determining whether it is possible to execute step S6 to step S11 of FIG. 6. When the control routine of FIG. 6 is executed in the second embodiment, step S6 to step S11 are executed under a condition that the calculation permission flag is set. When executing step S7 of FIG. 6, the ECU 30 obtains the expansion torque Te1, referring to the database created by the control routine of FIG. 7.

According to the control routine of FIG. 7, it is possible to obtain the expansion torque Te1 in view of individual differences and chronological changes of the internal combustion engine 3, as compared with the case where the expansion torque Te1 is obtained using the map created in advance as in the first embodiment, and a difference between the combustion-time engine torque Te and the expansion torque Te1 is calculated. Thus, the difference can be calculated according to the actual conditions, thus assuring improved accuracy in determination of misfire. In this connection, the database created according to the control routine of FIG. 7 may be updated when a condition for updating is satisfied, for example, when an accumulated value of the operating time of the engine 3 as measured from completion of the database exceeds a predetermined value, or an elapsed time from completion of the database exceeds a predetermined value. By updating the database in this manner, it is possible to provide database that appropriately reflects chronological changes of the engine 3. The ECU 30 functions as non-combustion-time engine torque obtaining portion according to the invention, when executing the control routine of FIG. 7.

The invention is not limited to the above-described embodiments, but may be carried out in various forms within the scope of the principle of the invention. The misfire detection system of the invention is not limitedly applied to the hybrid vehicle as shown in FIG. 1. For example, the invention may be applied to a hybrid vehicle in which one motor-generator is directly coupled to an internal combustion engine.

In each of the above-described embodiments, as shown in FIG. 5, the shift amount $\beta$ is calculated by obtaining the total value of differences between the combustion-time engine torque Te and the expansion torque Te1 included in the misfire determination period A while shifting the misfire determination period A from the starting point a before shifting while keeping the same length of the misfire determination period A, and searching for the shift amount $\beta$ with which the total value is maximized. However, calculating the shift amount $\beta$ with which the total value of the differences is maximized is a mere example. If the misfire determination period A can be shifted in a direction in which the total value of the differences increases, the misfire determination accuracy is less likely or unlikely to deteriorate as compared with the case where the starting point a is fixed. Accordingly, the invention may be carried out by calculating a shift amount with which the total value of the differences becomes 70% to 90% of the maximum value, for example, and shifting the misfire determination period based on the shift amount.

In each of the above-described embodiments, misfire is determined by calculating each-cylinder torque as the average value of combustion-time engine torque within the misfire determination period, and comparing the each-cylinder torque with the misfire determination torque. However, this method of determining misfire is a mere example of the method of determining misfire by evaluating combustion-time engine torque within the misfire determination period. For example, it is possible to determine misfire by calculating a difference between the minimum value and the maximum value of the combustion-time engine torque within the misfire determination period, and determining misfire by comparing the difference with a criterial value.

While the influence of the combustion overlapping is large when the internal combustion engine has five or more cylinders, the invention is not limitedly applied to internal combustion engines having five or more cylinders. The invention may be applied to any internal combustion engine provided that it has two or more cylinders. In this case, too, the accuracy in determination of misfire is expected to be improved.

What is claimed is:
1. An engine misfire detection system for use in a hybrid vehicle including a spark ignition type internal combustion engine having a plurality of cylinders, and a motor-generator, comprising:

a misfire determining portion that determines misfire of the internal combustion engine for each of the cylinders, by evaluating combustion-time engine torque produced when combustion takes place in the internal combustion engine, within a misfire determination period that is set to a predetermined range of crank angle;

a torque difference calculating portion that calculates a difference between the combustion-time engine torque, and a non-combustion-time engine torque produced when the internal combustion engine rotates without causing combustion, at intervals of a predetermined crank angle; and a shifting portion that shifts the misfire determination period in a direction to increase a total value of the differences calculated by the torque difference calculating portion within the misfire determination period, when ignition is retarded in the internal combustion engine.

2. The engine misfire detection system according to claim 1, further comprising:

a non-combustion-time engine torque obtaining portion that obtains and stores the non-combustion-time engine torque at intervals of the predetermined crank angle, during a period in which fuel cut is performed in the internal combustion engine, wherein the torque difference calculating portion calculates a difference between the combustion-time engine torque and the non-combustion-time engine torque stored in the non-combustion-time engine torque obtaining portion, at intervals of the predetermined crank angle.

3. The engine misfire detection system according to claim 2, wherein the non-combustion-time engine torque obtaining portion obtains the non-combustion-time engine torque by calculation based on an angular acceleration and a moment of inertia of the internal combustion engine, and an angular acceleration and a moment of inertia of the motor-generator.

\* \* \* \* \*